United States Patent
Zöcke et al.

(10) Patent No.: US 9,927,236 B2
(45) Date of Patent: Mar. 27, 2018

(54) METHOD AND APPARATUS FOR DETERMINING THE DISTANCE OF A LIGHT BEAM FROM A POINT ON A SURFACE OF AN OBJECT

(71) Applicant: Prüftechnik Dieter Busch AG, Ismaning (DE)

(72) Inventors: Christine Zöcke, Riemerling (DE); Nicolas Meunier, Berlin (DE); Dietrich Brunn, Unterföhring (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 476 days.

(21) Appl. No.: 14/659,360

(22) Filed: Mar. 16, 2015

(65) Prior Publication Data
US 2015/0260515 A1   Sep. 17, 2015

(51) Int. Cl.
*G01C 3/08* (2006.01)
*G01C 9/06* (2006.01)
*G01B 11/27* (2006.01)
*F01D 21/00* (2006.01)

(52) U.S. Cl.
CPC ............. *G01C 3/08* (2013.01); *F01D 21/003* (2013.01); *G01B 11/272* (2013.01); *G01C 9/06* (2013.01); *F05D 2260/83* (2013.01); *G01C 2009/066* (2013.01)

(58) Field of Classification Search
CPC ...................................... G01B 11/27
See application file for complete search history.

(56) References Cited

U.S. PATENT DOCUMENTS

| 4,518,855 | A  | * | 5/1985  | Malak ............. | G01B 11/272 |
|           |    |   |         |                    | 250/203.1   |
| 5,026,998 | A  | * | 6/1991  | Holzl .............. | G01B 11/27  |
|           |    |   |         |                    | 250/559.37  |
| 5,576,826 | A  |   | 11/1996 | Hamar              |             |
| 5,717,491 | A  | * | 2/1998  | Busch ............. | G01B 11/272 |
|           |    |   |         |                    | 250/206.2   |
| 7,403,294 | B2 |   | 7/2008  | Handman et al.     |             |
| 7,486,390 | B2 | * | 2/2009  | Suing .............. | G01B 11/272 |
|           |    |   |         |                    | 356/139.1   |
| 8,037,615 | B2 |   | 10/2011 | Glaser             |             |
| 9,476,697 | B2 | * | 10/2016 | Locoge ........... | G01B 11/12  |
| 2005/0068521 | A1 |  | 3/2005 | Abbasi et al.      |             |
| 2008/0015811 | A1 | * | 1/2008 | Conner ............ | G01C 15/002 |
|           |    |   |         |                    | 702/159     |

FOREIGN PATENT DOCUMENTS

DE    202004002121 U1   12/2004
DE    102004020406 A1   11/2005
(Continued)

OTHER PUBLICATIONS

EP 15153554, Extended European Search Report, dated Jul. 22, 2015.

*Primary Examiner* — Luke D Ratcliffe
(74) *Attorney, Agent, or Firm* — Millman IP, Inc.

(57) ABSTRACT

The invention relates to a method and an apparatus (30) for determining the distance between a light beam (10) and a point (12) on an object surface (14) using a light sensor (16) with a planar measuring field (18), the method comprising Steps A to E, and the apparatus (30) being configured so as to perform the method.

10 Claims, 8 Drawing Sheets

(56) References Cited

FOREIGN PATENT DOCUMENTS

| EP | 0543971 B1 | 12/1994 |
| --- | --- | --- |
| EP | 2559967 A1 | 2/2013 |
| FR | 2878951 A1 | 6/2006 |
| JP | H0798211 A | 4/1995 |
| JP | 10213416 A | 8/1998 |

* cited by examiner

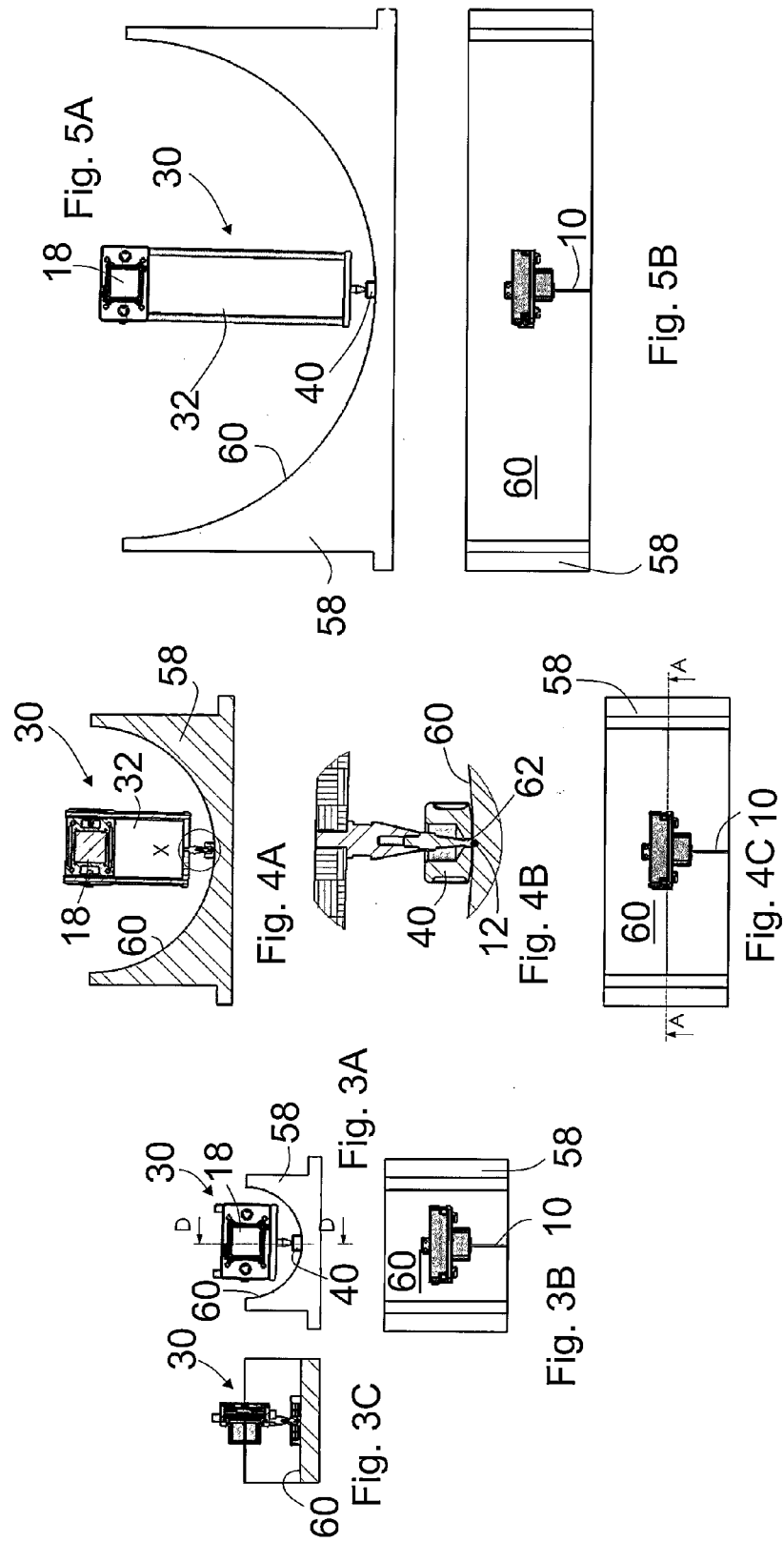

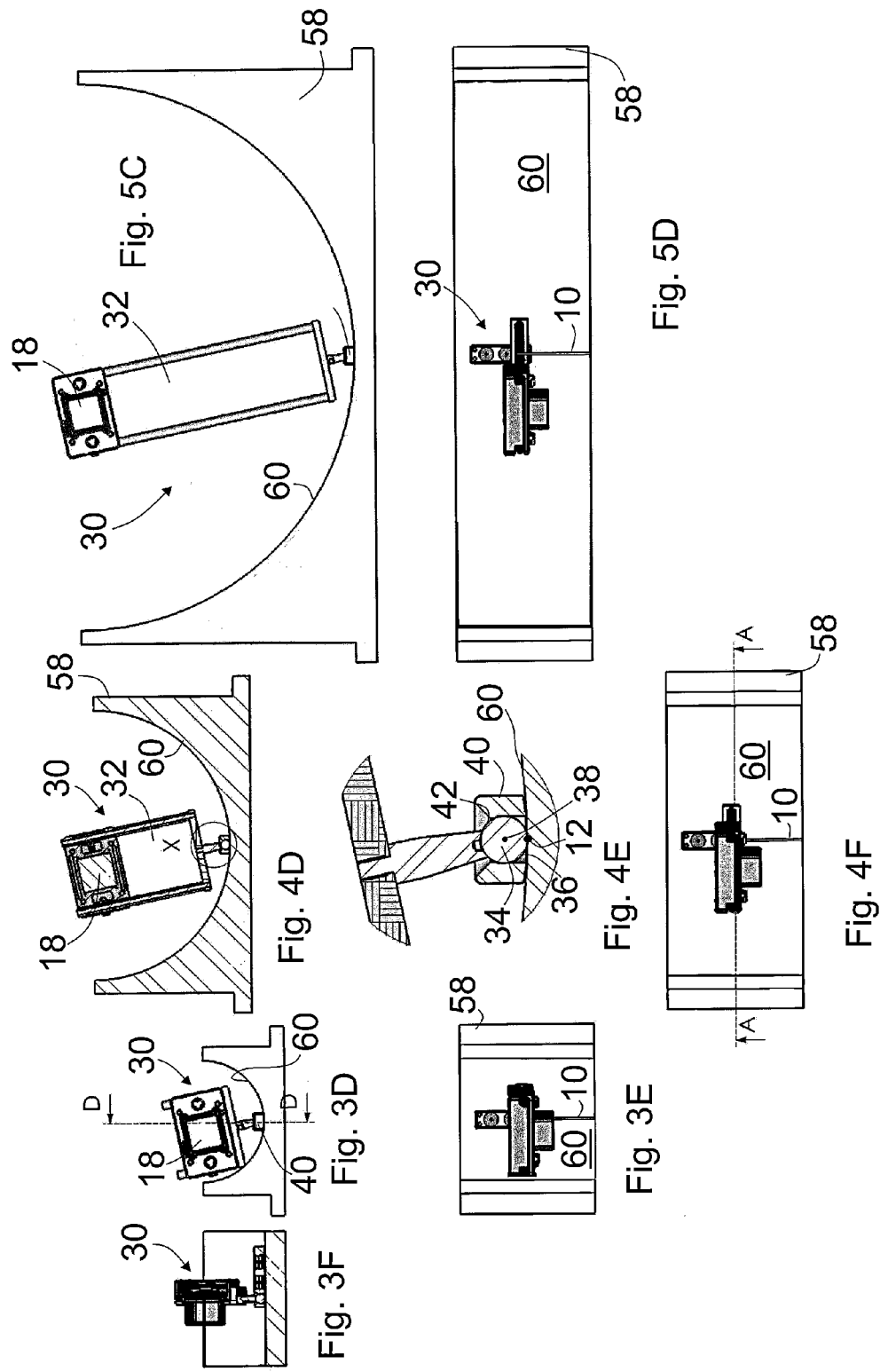

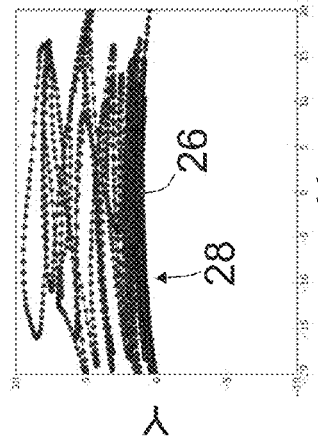
Fig. 6A  0°
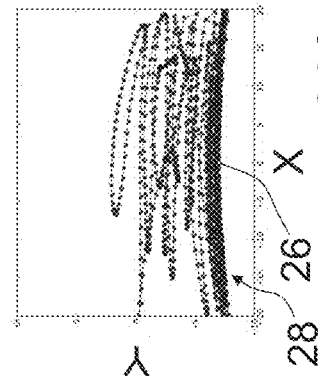
Fig. 6B  30°
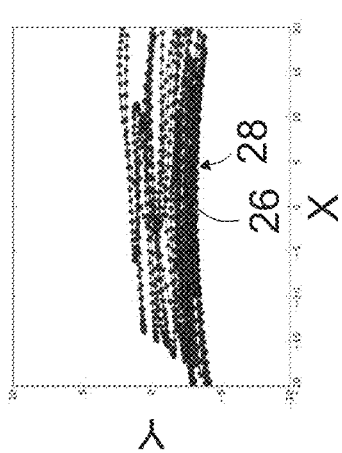
Fig. 6C  60°
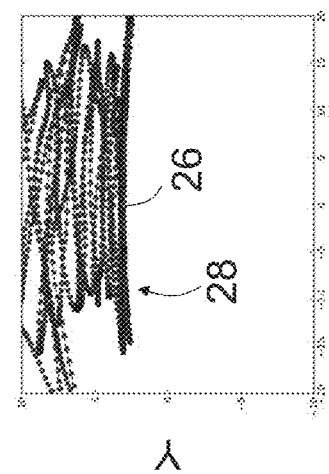
Fig. 6D  90°

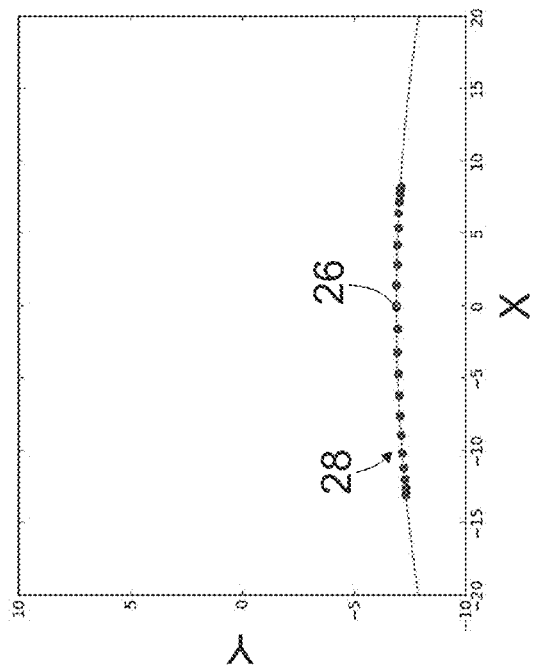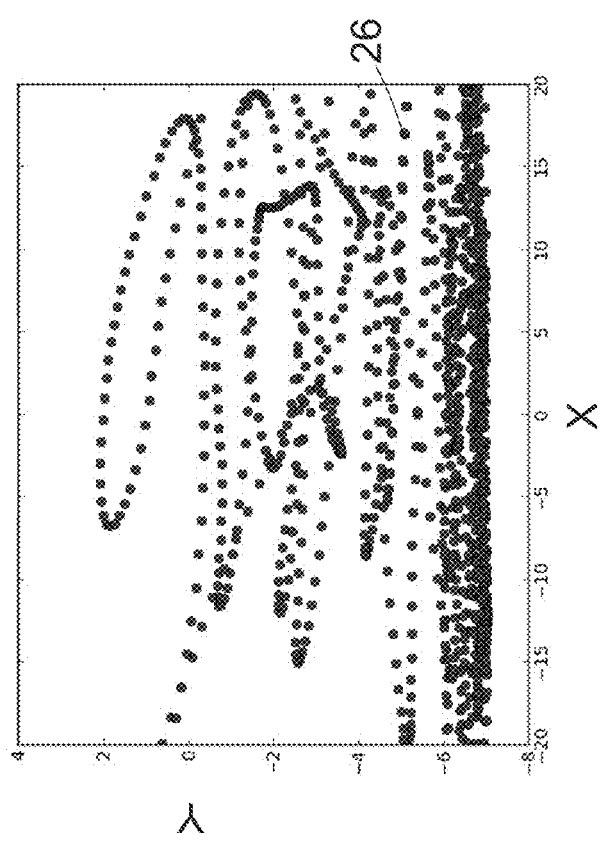
Fig. 8B
Fig. 8A

METHOD AND APPARATUS FOR DETERMINING THE DISTANCE OF A LIGHT BEAM FROM A POINT ON A SURFACE OF AN OBJECT

BACKGROUND OF THE INVENTION

The present invention relates to a method and an apparatus for determining the distance of a light beam from a point on a surface of an object by means of a light sensor with a planar measuring field.

Such methods and apparatuses are employed in particular when orienting objects relative to one another. It is thus known, e.g., for cylindrical bearing surfaces of two turbine rotor bearings spaced at a distance to one another and use of a light beam together with a light sensor to be arranged such that the center lines or axial centers of the curves are aligned among each other respectively with each other. To this end, the axial center of the curve of the bearing surface of one of the two turbine rotor bearings is made to coincide with the light beam, which is generally a laser beam. The distances of selected points on the bearing surface of the other turbine rotor bearing from the laser beam—serving here as a reference axis—are then determined by shining the laser beam at the planar measuring field of the sensor such that the distances can be calculated on the basis of the captured positions of the point of light on the measuring field. In turn, the distances so obtained can be used to determine the position into which the second turbine rotor bearing must be brought in order for the center lines or axial centers of the curves of the bearing surfaces to align with one another.

Methods and apparatuses for determining the distance of points or surfaces of an object from a light beam are known e.g. from U.S. Pat. No. 5,717,491, U.S. Pat. No. 5,576,826, U.S. Pat. No. 7,403,294 B2, U.S. Pat. No. 7,486,390 B2, U.S. Pat. No. 8,037,615, DE 10 2004 020 406 A1, EP 0 543 971 B1, JP10213416 A and US 2005/0068521 A1. A measuring apparatus having a measuring probe for measuring an object surface is known from DE 20 2004 002 121 U1.

In the method for orientation of objects described above, the measuring field is arranged perpendicular or nearly perpendicular to the light beam in order to obtain the most accurate distance measurement possible, as the measuring field functions with the greatest accuracy in this position. The perpendicular orientation of the measuring field is usually effected using additional measuring devices, such as an additional measuring field or a position detector; in the event that multiple points on the surface of the object are to be measured, the positioning of the measuring field must often be repeated multiple times. In the solutions in the prior art, then, the perpendicular orientation of the measuring field is associated with significant effort and difficulty, which in turn increases the difficulty and time required to determine or measure the distance.

UNDERLYING OBJECT

The purpose of the invention is to reduce the effort and difficulty involved in determining the distance of a light beam from a point on the surface of an object.

This object is achieved in accordance with the invention with a method having the features of claim 1 and with an apparatus with the features of claim 2.

The method comprises the following steps:
(A) Positioning of the measuring field such that the light beam strikes the measuring field,
(B) Pivoting of the measuring field about a first pivot axis running parallel to and at a distance from the light beam, and pivoting of the measuring field about at least one second pivot axis while the measuring field is pivoted about the first pivot axis, wherein the second pivot axis is a skew line to the light beam, wherein the measuring field is pivoted about a common intersection of the second pivot axis and the first pivot axis having a predefined position relative to the point on the object surface, and wherein, during the pivoting about the second pivot axis, a pivot position in which the light beam is oriented perpendicularly to the measuring field is traversed at least three times,
(C) Capturing of the positions of the point of light of the light beam on the measuring field by the light sensor, which the point of light on the measuring field during the pivoting motion in accordance with Step B assumes,
(D) Determining those positions of the positions captured in Step C which describe on the measuring field a circular arc at a distance to the point of intersection that is less than the distance of the other positions captured in Step C to the point of intersection, and
(E) Determining the distance between the light beam and the point on the object surface on the basis of the path of the circular arc in accordance with Step D and the predefined position relative to the point on the object surface.

By means of the simultaneous pivoting about the first and the second pivot axes, the position of which is defined above, a precise determination of the distance to the corresponding point on the object surface can advantageously be made, without the requirement that a time-consuming perpendicular orientation of the measuring field be effected, as required by previously known solutions, as demonstrated below.

Due to the fact that, in pivoting about the second pivot axis in Step B, a pivot position in which the light beam is oriented perpendicularly to the measuring field is traversed at least three times, this perpendicular pivot position is taken into account in Step C in registering the positions of the point of light. As this perpendicular pivot position in turn is distinguished by the fact that the point of light of the light beam—which may in particular be a laser beam—assumes a position on the measuring field in the perpendicular pivot position in which, in comparison to the positions in other pivot positions about the second axis, which is a skew line of the light beam, the distance to the point of interface serving as a pivot point is the smallest (as can be plainly seen from simple geometric observations), the perpendicular pivot position can be clearly determined from all positions captured in Step C. Furthermore, as in addition to the pivoting about the second pivot axis a pivoting motion is also simultaneously made about the first pivot axis, which runs parallel to the light beam and at a distance from it, it is then only necessary in accordance with Step D to determine, from amongst those captured in Step C, those which describe on the measuring field a circular arc with a distance to the point of intersection less than that of the distance between the other positions captured in Step C and the point of intersection. The circular arc is the curve described by the point of light when pivoted about the first pivot axis when the measuring field is in the perpendicular pivot position. In order for a circular arc to be describable or determinable or definable from the captured positions in this perpendicular pivot position, the invention provides that the perpendicular pivot position—i.e that position in which the light beam is oriented perpendicular to the measuring field—is traversed at least three times, as a circle or circular arc is unambiguously defined by at least three points or positions on its circumference. In order to most precisely form the path of the circular arc, the perpendicular pivot position is traversed at least five or ten times, or more than ten times. In accordance with Step E, once the aforementioned circular arc has been found or determined, the distance of the light beam from the point on the object surface can then be determined on the basis of the path of the circular arc and the predefined relative position to the point on the object surface or on the basis of a predefined distance to the point on the object surface. In particular, for this purpose, the distance e.g. of the circular arc from the point of intersection of the second and the first pivot axes serving as a pivot point can be simply determined by calculating the radius of the circular arc, as the radius corresponds to this distance. Finally, the distance from the light beam to the point on the object surface can then be calculated using the predefined or known relative position of the point of intersection to the point on the object surface, or on the basis of a predefined distance to this point. As the distance is calculated on the basis of the positions of the point of light in the perpendicular pivot position, the distance measurement is highly accurate, without the need for a time-consuming orientation of the measuring field to be carried out first, as previous solutions require.

Taken as a whole, then, the effort and time needed to determine the distance between a light beam and a point on a surface of an object can thus be reduced, as the time-consuming orientation of the planar measuring field so as to be perpendicular relative to the light beam can be omitted. With the method in accordance with the invention, it need merely be ensured, among other things, that the perpendicular pivot position of the measuring field be traversed at least three times when being pivoted about the second pivot axis, which is skew to the light beam.

The second pivot axis being skew to the light beam may be oriented or may run in particular e.g. perpendicularly to the laser beam and perpendicularly to the first pivot axis.

Steps A to E are performed in sequence, i.e. Step B after Step A, Step C after Step B, Step D after Step C, and Step E after Step D.

It is clear that the predefined position of the point of intersection relative to the point on the object surface can include not only a divergence between the point of intersection with the point on the object surface (i.e. a separation of the two points), but in particularly also the convergence of the point of intersection with the point on the object surface.

The light sensor or sensor can be any arbitrary sensor equipped with a planar measuring field. Particularly advantageous is a sensor having multiple line sensors to form the measuring field.

The apparatus in accordance with the invention in accordance with claim 2 is particularly well-suited for performing the method described above, and is distinguished by the fact that the measuring field can be pivoted about a common point of intersection of a first pivot axis and at least one second pivot axis, such that the measuring field is also pivotable about the second pivot axis while pivoting is occurring about the first pivot axis, wherein the first pivot axis runs parallel to and a distance from the light beam, and wherein the second pivot axis is a pivot axis that is a skew line to the light beam, wherein the point of intersection has a predefined relative position to the point on the object surface, and wherein the measuring field is pivotable about the second pivot axis such that a perpendicular pivot position can be traversed in which the light beam is oriented perpendicularly to the measuring field.

Due to the provided pivotability about the second pivot axis and the first pivot axis around the point of intersection serving as a pivot point, the effort to determine or measure the distance between a light beam and a point on an object surface can be reduced by means of the apparatus for the reasons already set forth above. The measuring field need merely be pivoted using the apparatus in the manner described prior to capturing the positions of the point of light and determining the corresponding distance. A laborious orienting of the measuring field to assume a perpendicular position relative to the laser beam can advantageously be omitted.

In one practical embodiment, the measuring field is mounted on a spacer of the apparatus intended to position the measuring field at a distance from the point on the surface of the object. By means of the spacer, the determination of the distance from the corresponding point on the object surface can be performed in a very reliable manner via pivoting about the first and second pivot axis.

Preferably, a sphere is affixed to one end of the spacer, intended to form a contact with the point on the object surface via the spherical surface of the sphere, and wherein the measuring field may be pivoted about the center of the sphere converging with the point of intersection while maintaining the contact between the sphere and the point on the object surface. Through provision of the sphere, the pivoting about the first and second pivot axis to be performed in order to determine or measure the distance can be undertaken in a simple and practical manner; to this end, the sphere must be brought into contact with the corresponding point on the object surface. In particular, through provision of the sphere, a simple, reliable manual pivoting of the measuring field can be realized. If the sphere is provided, the center of the sphere coincides with the point of intersection of the pivot axes, such that the corresponding point on the object surface is spaced from the point of intersection of the pivot axes. The sphere may preferably consist of a metallic material with a high degree of rigidity, which in turn is advantageous for precise pivoting.

In order to enable a determination of distance that is very reliable in operation and also precise, the apparatus preferably has a retaining device to retain the spacer in a fixed position on the surface of the object.

Particularly advantageously the retaining device is formed to be at least in some areas magnetic, in order to ensure the attachment of the same to an at least in some areas magnetic surface area of the object surface. Thus, a retention of the spacer on the object surface can be easily and practically realized through magnetic force, in particular without the provision of complex retaining means.

In one practical embodiment, the sphere is mounted rotatably in a receptacle of the retaining device, permitting the advantage of easy pivotability by means of the sphere to be combined with the advantage of the very reliable and also precise measurement of distance provided by the retaining device.

In a further practical embodiment, the apparatus has an inclinometer to additionally determine the inclination of the distance relative to the true vertical.

Through the provision of the inclinometer, the apparatus is particularly well suited for the relative orientation with regard to one another of curved object surfaces, i.e. if one is faced with the task of positioning cylindrical bearing surfaces of two turbine rotor bearings placed at a distance from another such that their center lines or axial centers of their curves align among one another respectively with one another. For this, information concerning the direction of the distances to be determined relative to true vertical are also needed in order to determine the position of the center line of the curve. The inclinometer here measures the incline of the apparatus relative to true vertical, which corresponds to the direction or incline relative to true vertical of the distances to be determined, or from which the direction or incline relative to true vertical can be determined.

In one preferred embodiment, the apparatus is configured so that, when the measuring field is pivoted about the first pivot axis and the second pivot axis, those positions are automatically determined from among the positions captured which describe on the measuring field a circular arc having a distance from the point of intersection that is smaller than the distance between the other captured positions and the point of intersection. Thus, the circular arc or corresponding positions of the point of light can be made available to the user immediately after the pivoting about the first pivot axis and the second pivot axis in order to use the circular arc or the positions of the point of light, e.g. for a further evaluation.

Particularly preferably the apparatus is furthermore configured to automatically determine the distance from the light beam to the point on the object surface on the basis of the path of the circular arc and the predefined position of the point of intersection relative to the point on the object surface, so that the user need merely perform the necessary pivoting movement and can then be advantageously provided with the desired distance, e.g. by means of an interface of the apparatus. It is in particular conceivable that the distance value could be wirelessly transmitted to the user, e.g. to his laptop or tablet computer.

BRIEF DESCRIPTION OF DRAWINGS

Exemplary embodiments of the invention are described below on the basis of the attached drawings. The drawing depicts the following:

FIG. 1A depicts a highly schematic front view and FIG. 1B a highly schematic side view of an apparatus 30 for determining the distance of a light beam 10 in the form of a laser beam from a point 12 on an object surface 14, which can be, as schematically illustrated here, e.g. a cylindrical bearing surface 47 of a turbine rotor bearing.

Figure 1:
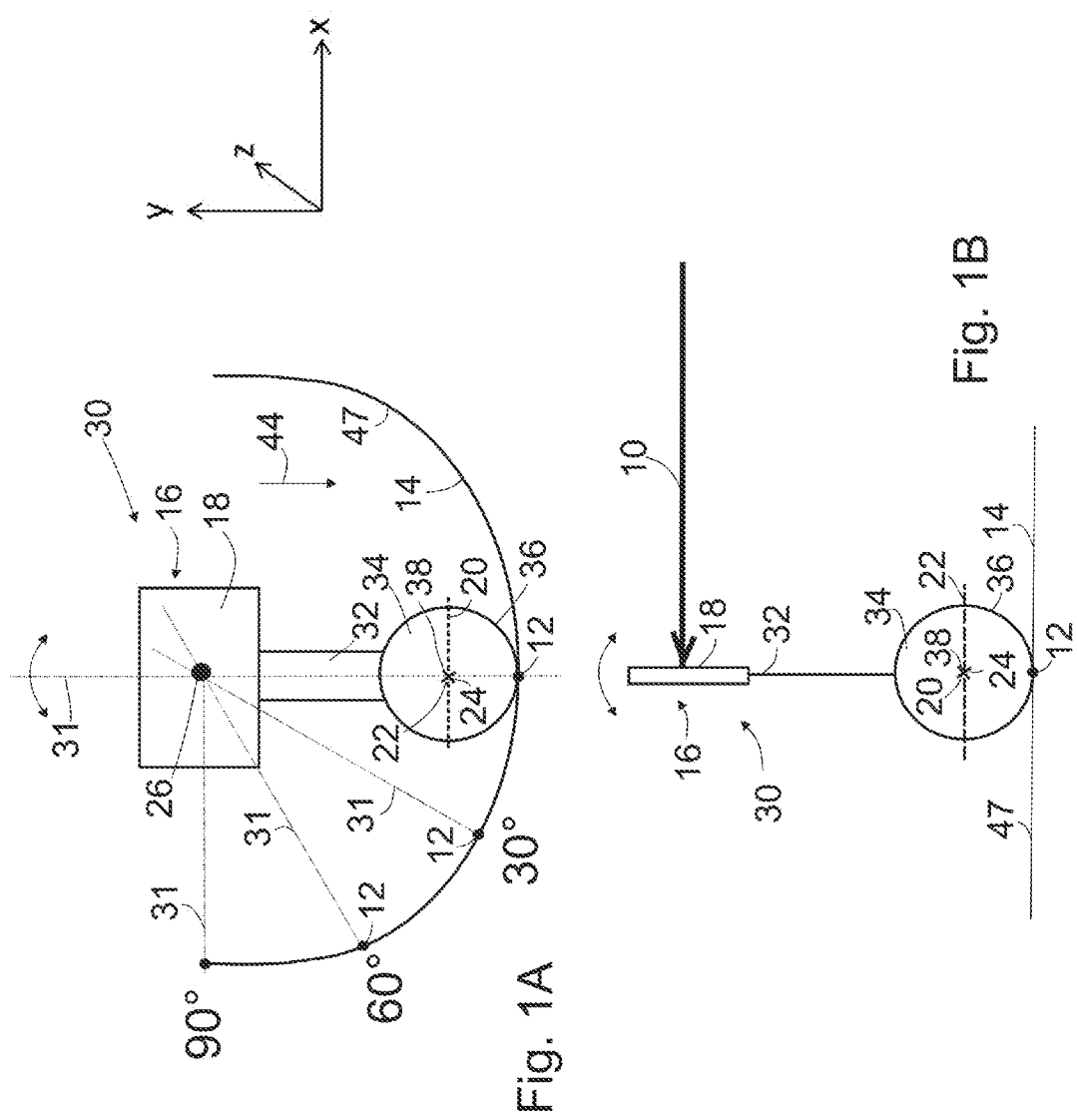
FIGS. 1A and 1B Schematic representations of a first exemplary embodiment of an apparatus in accordance with the invention, FIG. 2 a schematic representation of a second exemplary embodiment of an apparatus in accordance with the invention, along with two turbine rotor bearings, FIG. 3A to 3F schematic representations of a third exemplary embodiment of an apparatus in accordance with the invention, FIG. 4A to 4C schematic representations of a fourth exemplary embodiment of an apparatus in accordance with the invention, FIG. 4D to 4F schematic representations of a fifth exemplary embodiment of an apparatus in accordance with the invention, FIG. 5A to 5D schematic representations of a sixth exemplary embodiment of an apparatus in accordance with the invention, FIG. 6A to 6D representations to illustrate captured positions of a point of light of a laser beam on a measuring field, FIG. 7 a schematic representation to illustrate the path of positions of a point of light describing a circular arc on a measuring field, FIGS. 8A and 8B further representations to illustrate captured positions of a point of light of a laser beam on a measuring field, and FIG. 9 a schematic representation to illustrate a method for determining the axial center of the curve of a bearing surface of a turbine rotor bearing.

The apparatus 30 has a light sensor 16 with a planar measuring field 18. The light sensor 16 is configured so as to capture the position of a light spot 26 of the light beam 10 striking the measuring field 18 on the measuring field 18.

The measuring field 18 is pivotable about a common point of intersection 24 of a first pivot axis 22 and a second pivot axis 20, such that the measuring field 18 is also pivotable about the second pivot axis 20 while being pivoted about the first pivot axis 22, wherein the first pivot axis 22 runs parallel to and at a distance from the light beam 10, and wherein the second pivot axis 20 is a skew line pivot axis 20 to the light beam 10. Among those skilled in the art, the first pivot axis 22 is also known as the roll axis and the second pivot axis 20 as the pitch axis.

The common point of intersection 24 exhibits a predefined relative position or a predefined distance to point 12 on the object surface 14. Furthermore, the measuring field 18 is pivotable about the second pivot axis 20 such that a perpendicular pivot position can be traversed in which the light beam 10 is oriented perpendicularly to the measuring field 18. The perpendicular pivot position of the measuring field 18 in which the measuring field 18 functions with the greatest accuracy, or determines the positions of the point of light with the greatest accuracy, is illustrated in FIG. 1B.

The measuring field 18 is attached to a spacer 32 of the apparatus 30 which is intended to position the measuring field 18 at a distance from the point 12 on the object surface 14. In order to realize the pivotability described above about the first pivot axis 22 and the second pivot axis 20 that is skew to the light beam 10—which, in the exemplary embodiment illustrated here, is oriented perpendicularly to the laser beam 10 and to the first pivot axis 22—a sphere 34 is affixed to the end of the spacer 32. The sphere 34 is provided to form a contact with the point 12 on the object surface 14 via the spherical surface 36 of the sphere 34.

The measuring field 18 is pivotable about the center 38 of the sphere 34 coinciding with the point of intersection 24, while maintaining contact between the sphere 34 and the point 12 on the object surface 14.

A method for determining the distance of the light beam 10 from the point 12 on the surface of an object 14 using the apparatus 30 comprises the following steps:
 (A) Positioning the measuring field 18 such that the light beam 10 strikes the measuring field 18,
 (B) Pivoting the measuring field 18 about the first pivot axis 22, which runs parallel to and at a distance from the light beam 10, and pivoting the measuring field about the second pivot axis 20 while the measuring field is pivoted about the first pivot axis 22, wherein the second pivot axis 20 is skew to the light beam 10, wherein the measuring field 18 is pivoted about the common point of intersection 24 of the second pivot axis 20 and the first pivot axis 22 when pivoting, which has a predefined position relative to the point 12 on the object surface 14, and wherein, when pivoting about the second pivot axis 20, a pivot position in which the light beam 10 is oriented perpendicularly (see FIG. 1B) to the measuring field is traversed at least three times, (C) Capturing the positions of the point of light 26 of the light beam 10 on the measuring field 18 by means of the light sensor 16, which the point of light 26 assumes on the measuring field 18 while pivoting in accordance with Step B, (D) Determining of the positions among those captured in step C which describe on the measuring field 18 a circular arc 28 having a distance to the point of intersection 24 less than the distance between the point of intersection 24 and the other positions captured in step C, and (E) Determining of the distance between the light beam 10 and the point 12 on the object surface 14 on the basis of the path of the circular arc 28 in accordance with step D and the predefined relative position of the common point of intersection 24 in the center 38 of the sphere to the point 12 on the object surface 14, wherein the distance from the light beam 10 to the point of intersection 24 corresponds to the radius of the circular arc 28, which, as is well known, can be simply calculated, or read in a coordinate system as shown in FIGS. 6A through 6D as the maximum y-value when x=0.

Figure 7:
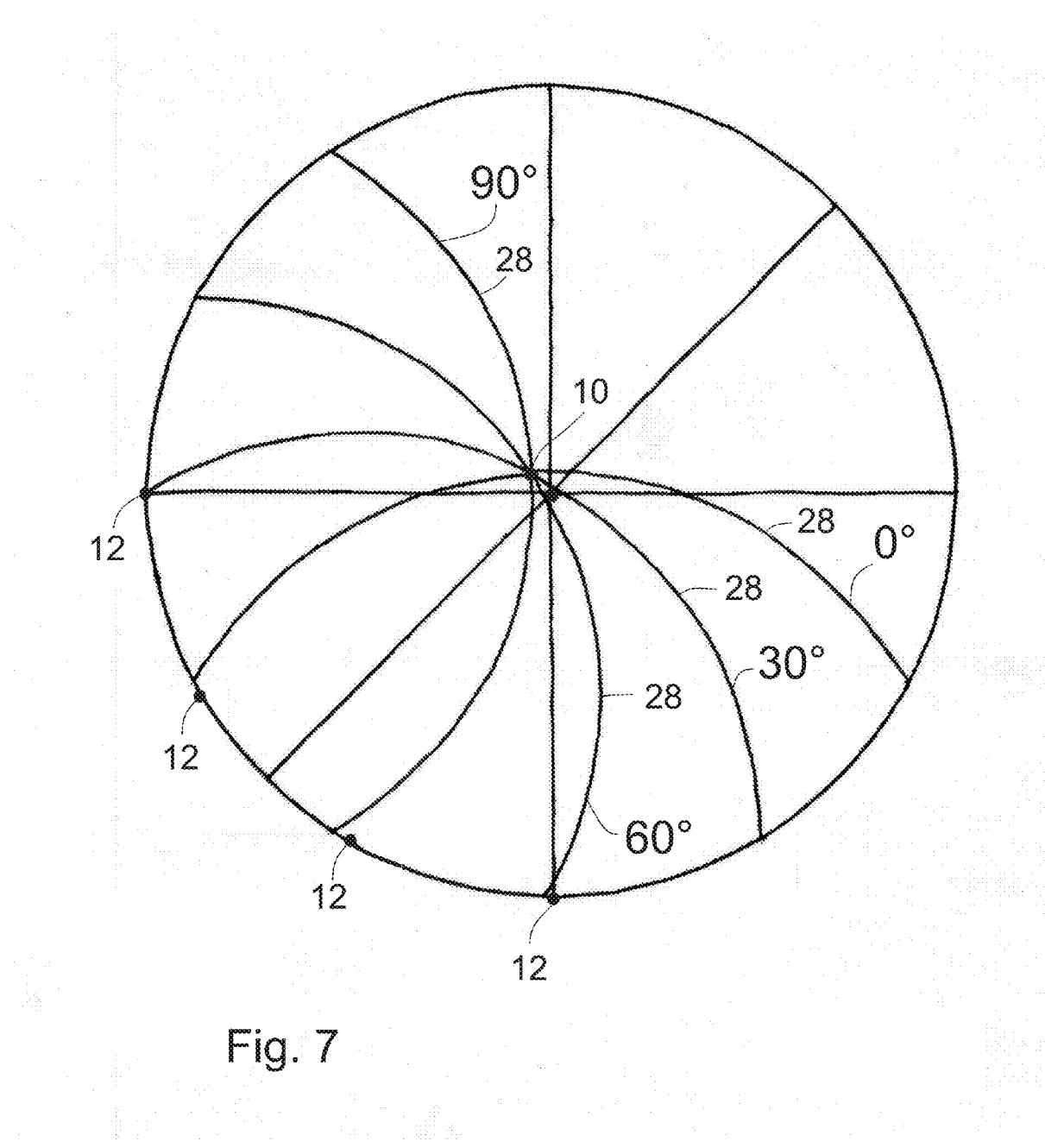

FIGS. 6A through D serve to illustrate the positions of the point of light 26 on the measuring field 18 resulting from the pivoting motion provided for in Step B. It can thus be gleaned e.g. from FIG. 6A that, when pivoted to a 0° orientation (see FIG. 1A), i.e. in an orientation of the apparatus 30 in which its longitudinal axis 31 is oriented parallel to true vertical 44, the point of light 26 in the perpendicular pivot position describes a circular arc 28 having a distance to the point of intersection 24 less than that between the other positions captured in step C and the point of intersection 24. This is also manifested in FIGS. 6A to 6D in that the Y-coordinates (see also the coordinate system of the measuring field in FIG. 1A) of the positions of the point of light 26 on the circular arc 28 have smaller values than the other positions of the point of light. This characteristic typical of the perpendicular position of the measuring field 18 is of course also present if pivoting is performed in the other orientations of the apparatus, i.e. at the 30° orientation, the 60° orientation, and the 90° orientation, in order to measure the distance from the light beam 10 or laser beam 10 of the points 12 provided for these points—see also FIG. 1A, wherein the 30° orientation, the 60° orientation, and the 90° orientation are illustrated through a corresponding depiction of the longitudinal axis 31. That the light beam 10 moves "upward" when the measuring field is pivoted from the perpendicular pivot position, i.e. toward higher Y-values, can be seen from simple geometrical observations. The path of the circular arcs 28 for the various different orientations of the apparatus 30 relative to true vertical 44 is also illustrated schematically in FIG. 7.

In the x-y diagrams e.g. in accordance with FIGS. 6A through 6D, the distance values determined in each case, in particular for different orientations of the apparatus, can be depicted as a digital value using color coding.

In order to extract each circular arc 28 in the perpendicular pivot position of the measuring field from the other positions of the point of light 26 as accurately as possible, one can, e.g., stretch the coordinate system in the direction of the Y-axis, as illustrated in FIG. 8A. FIG. 8B depicts the circular arc 28 after the extraction and removal of the other positions of the point of light.

The positioning of the 30° orientation and the 60° orientation of the apparatus 30, i.e. an orientation in which the longitudinal axis 31 of the apparatus 30 is rotated at an angle of 30°, 60°, or 90° from true vertical 44, is performed using an inclinometer (not depicted) with an accuracy of 0.5° degrees in the x-direction and an accuracy of 0.1° in the x-direction and y-direction (see FIG. 1A) intended to measure the angle of the apparatus 30 relative to true vertical 44, and thus also to measure the angle of the distances to be determined relative to true vertical 44. The measuring principle of the inclinometer does not permit its use in setting the 90° orientation, so an approximately correct positioning at 90° must suffice.

Figure 2:
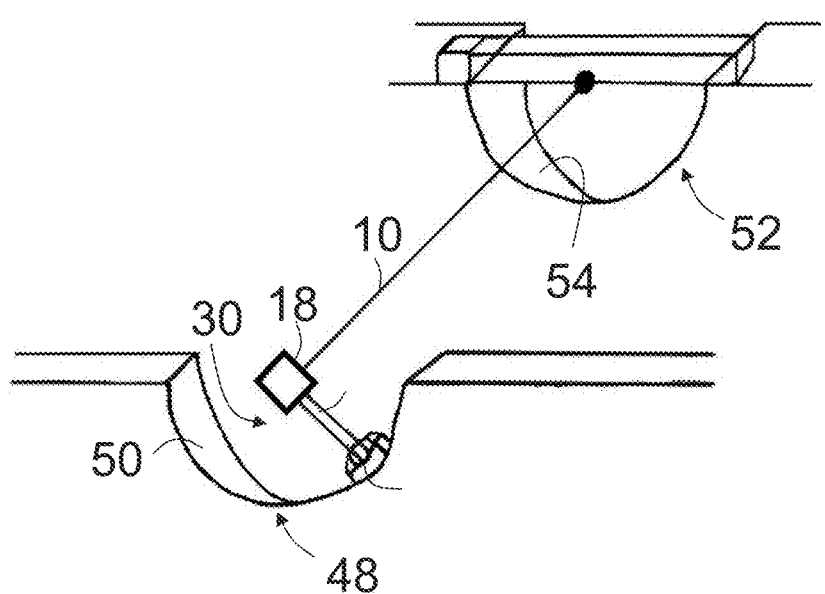

By means of the distance determination or distance measurement of points 12 as described above, which are associated with differing orientations relative to true vertical 44, the spatial position of the axial center of the curve of a bearing surface of a turbine rotor bearing relative to the light beam or laser beam can be determined using an apparatus 30 (see FIG. 2) in order e.g. to position a turbine bearing 48 with a bearing surface 50 such that it aligns with the axial center of the curve of a second turbine bearing 52 with a bearing surface 54, wherein the laser beam 10 is arranged as a reference congruently with the axial center of the curve of the bearing surface 54 of the second turbine bearing 52.

Figure 9:
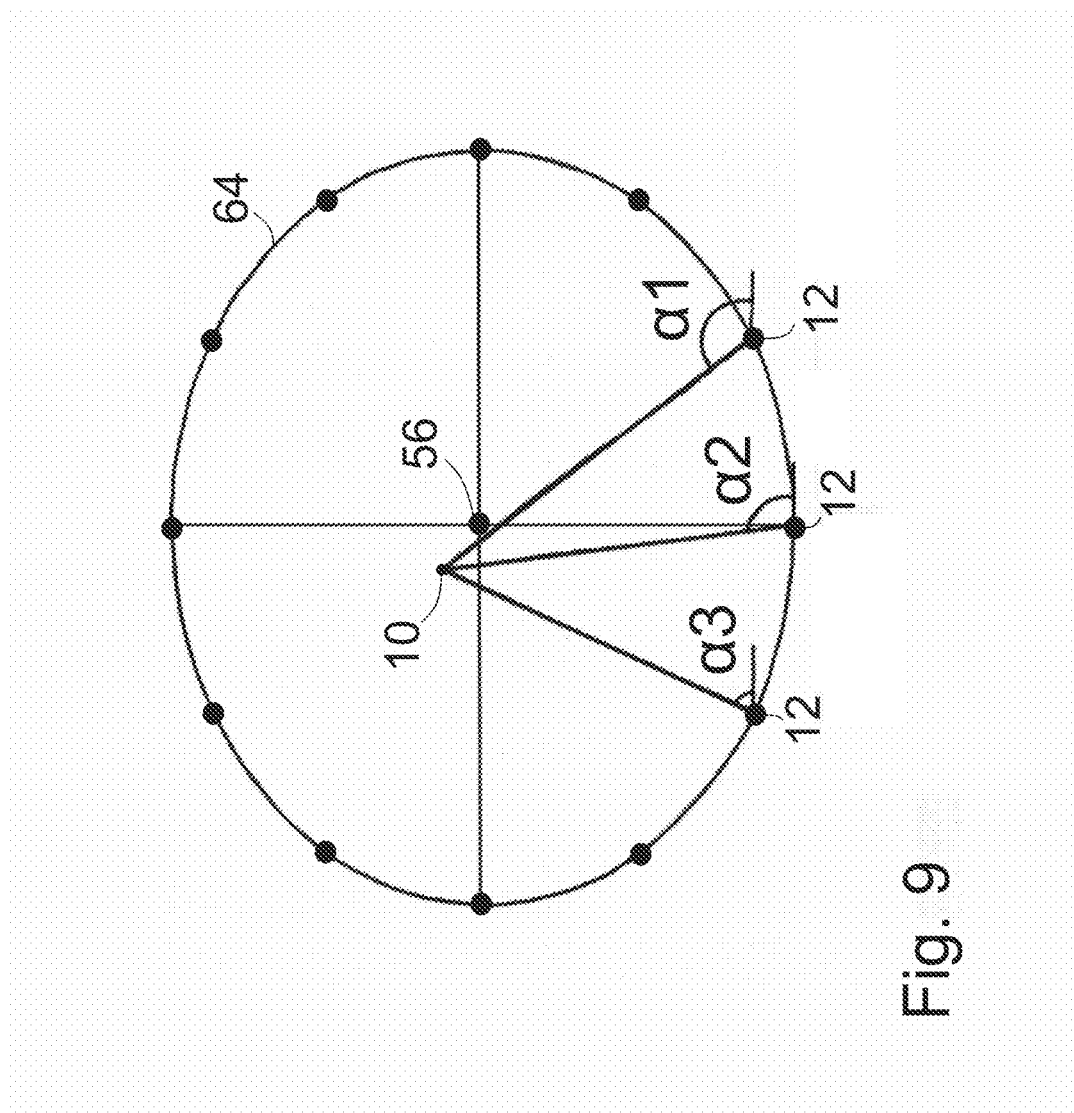

An ellipse fit can be used to determine the spatial position of the axial center of the curve of a bearing surface of a turbine rotor bearing relative to the light beam or laser beam 10, as illustrated below by means of FIG. 9. After the distance (see corresponding distance lines in FIG. 9) has been determined in the manner described above e.g. for three or more different points 12 on the bearing surface, all positioned in the same plane perpendicular to the center line of the curve and each associated with one orientations α1 to α3, also using the length of the spacer 32, an ellipse fit 64 can be fitted through the points 12 on the bearing surface. The center of the ellipse fit 64 is then a very close approximation of the actual position of the center line of the curve 56 relative to the laser beam 10.

At the apparatus 30 for determining the distance between a light beam 10 and a point on an object surface in accordance with FIGS. 3A through 3F, which are illustrated in a situation in which they are located in a turbine bearing 58 for the purpose of determining distance and the orientation of the axial center of the curve, a retaining device 40 for retaining the spacer 32 in a fixed position on the surface of the object in the form of the bearing surface 60 by magnetic force is also provided. FIGS. 4D through 3F differ from FIGS. 3A to 3C, which depict the apparatuses 30 in front, side, and top view respectively, only in that an orientation inclined from true vertical was selected, but otherwise depict precisely the same exemplary embodiment. The same applies also for the exemplary embodiment of the apparatus in accordance with FIGS. 5A through 5D, which is distinguished from the apparatus 30 in accordance with FIGS. 4A through 4F in particular by its larger dimensions, in order to be usable with a larger bearing surface 60.

The apparatus 30 in accordance with FIGS. 4A to 4C is distinguished from the apparatus 30 in accordance with FIGS. 4D and 4E in particular in that, in place of a sphere 34, a tapering point 62 (see in particular the detailed depiction in accordance with FIG. 4B) is intended to establish a contact with the corresponding point 12 on the bearing surface 60, such that the point on the bearing surface 60 coincides or nearly coincides with the point of intersection of the angled second pivot axis 20 and first pivot axis 22 serving as a pivot point (see FIGS. 1A and 1B).

In the apparatus 30 in accordance with FIGS. 4D and 4E, a sphere 34 is attached to the end of the spacer 32 (see in particular the detailed depiction in accordance with FIG. 4E), which is intended to establish a contact with the point 12 on the bearing surface 60 via the spherical surface 36 of the sphere 34. The measuring field 18 is pivotable about the center 38 of the sphere 34 coinciding with the point of intersection 24 (see FIGS. 1A and 1B) while maintaining the contact between the sphere 34 and the point 12 on the bearing surface 60. The sphere 34 is mounted rotatably in a receptacle 42 of a retaining device 40.

LIST OF REFERENCE SIGNS 10 light beam
12 point
14 object surface
16 light sensor
18 planar measuring field
20 second pivot axis
22 first pivot axis
24 common point of intersection
26 point of light
28 circular arc
30 apparatus
31 longitudinal axis
32 spacer
34 sphere
36 spherical surface
38 center of a sphere
40 retaining device
42 receptacle
44 true vertical
47 bearing surface
48 turbine bearing
50 bearing surface
52 turbine bearing
54 bearing surface
56 center line of a curve
58 turbine bearing
60 bearing surface
62 point
64 ellipse fit

The invention claimed is:

1. A method for determining the distance from a light beam (10) to a point (12) on a surface of an object (14) by means of a light sensor (16) with a planar measuring field (18), comprising the following steps:
(A) positioning of the measuring field (18) such that the light beam (10) strikes the measuring field (18),
(B) pivoting of the measuring field (18) about a first pivot axis (22), which runs parallel to and at a distance from the light beam (10), and pivoting of the measuring field about at least one second pivot axis (20) while the measuring field is pivoted about the first pivot axis (22), wherein the second pivot axis (20) is skew to the light beam (10), wherein the measuring field (18) is pivoted about the common point of intersection (24) of the second pivot axis (20) and the first pivot axis (22) when pivoting, which has a predefined position relative to the point (12) on the object surface (14), and wherein, when pivoting about the second pivot axis (20), a pivot position in which the light beam (10) is oriented perpendicularly to the measuring field (18) is traversed at least three times,
(C) capturing of the positions of the point of light (26) of the light beam (10) on the measuring field (18) by the light sensor (16), which the point of light (26) assumes on the measuring field (18) during pivoting in accordance with step B,
(D) determining of the positions among those captured in step C which describe on the measuring field (18) a circular arc (28) having a distance to the point of intersection (24) less than the distance between the point of intersection (24) and the other positions captured in step C, and
(E) determining of the distance between the light beam (10) and the point (12) on the object surface (14) on the basis of the path of the circular arc (28) in accordance with step D and the predefined position relative to the point (12) on the object surface (14).

2. An apparatus (30) for determining the distance between a light beam (10) and a point (12) on an object surface (14), having a light sensor (16) with a planar measuring field (18) that is affixed to a first end of a spacer (32) at a first end thereof, the spacer (32) being affixed at a second end thereof to a sphere (34), the light sensor (16) being configured to capture the position of a point of light (26) on the measuring field (18) of the light beam (10) striking the measuring field (18), the sphere (34) being provided to establish a contact with the point (12) on the object surface (14) via the spherical surface (36) of the sphere (34), wherein the measuring field (18) may be pivoted about the center (38) of the sphere (34) while maintaining the contact between the sphere (34) and the point (12) on the object surface (14), the center of the sphere coinciding with a joint point of intersection (24) of a first pivot axis (22) and at least one second pivot axis (20), such that the measuring field (18) can be pivoted about the second pivot axis (20) while also being pivoted about the first pivot axis (22), wherein the first pivot axis (22) runs parallel to and at a distance from the light beam (10), and wherein the second pivot axis (20) is a skew line pivot axis (20) to the light beam (10), wherein the point of intersection (24) has a predefined position relative to the point (12) on the object surface (14), and wherein the measuring field (18) is rotatable about the second pivot axis (20) such that a perpendicular pivot position can be traversed in which the light beam (10) is oriented perpendicularly to the measuring field (18), the apparatus having a distance calculation module determining the distance between the light beam (10) and the point (12) on the object surface (14) according to the positions of the point of the light (26) of the light beam (10) captured on the measuring field (18) by the sensor (16) which the point of light (26) assumes on the measuring field (18) during the measuring field (18) pivoting.

3. An apparatus (30) in accordance with claim 2, characterized in that the apparatus (30) has a retaining device (40) to retain the spacer (32) in a fixed position on the surface of the object (14).

4. An apparatus (30) in accordance with claim 3, characterized in that the retaining device (40) is formed to be at least in some areas magnetic, in order to ensure the attachment of the same to an at least in some areas magnetic surface area of the object surface (14).

5. An apparatus (30) in accordance with claim 3, characterized in that the sphere (34) is mounted rotatably in a receptacle (42) of the retaining device (40).

6. An apparatus (30) in accordance with claim 2, characterized in that the apparatus (30) has an inclinometer to additionally determine the inclination of the distance relative to true vertical (44).

7. An apparatus (30) in accordance with claim 2, characterized in that the apparatus (30) is configured so that, when the measuring field (18) is pivoted about the first pivot axis (22) and the second pivot axis (20), those positions are automatically determined from among the positions captured which describe on the measuring field (18) a circular arc (28) having a distance from the point of intersection (24) that is smaller than the distance between the other positions captured and the point of intersection (24).

8. An apparatus (30) in accordance with claim 7, characterized in that the apparatus (30) is additionally configured to automatically determine the distance from the light beam (10) to the point (12) on the object surface (14) on the basis of the path of the circular arc (28) and the predefined position of the point of intersection (24) relative to the point (12) on the object surface (14).

9. An apparatus (30) in accordance with claim 2, characterized in that the apparatus (30) has a retaining device (40) to retain the spacer (32) in a fixed position on the surface of the object (14).

10. An apparatus (30) in accordance with claim 9, characterized in that the retaining device (40) is formed to be at least in some areas magnetic, in order to ensure the attachment of the same to an at least in some areas magnetic surface area of the object surface (14).

\* \* \* \* \*